Patented June 19, 1951

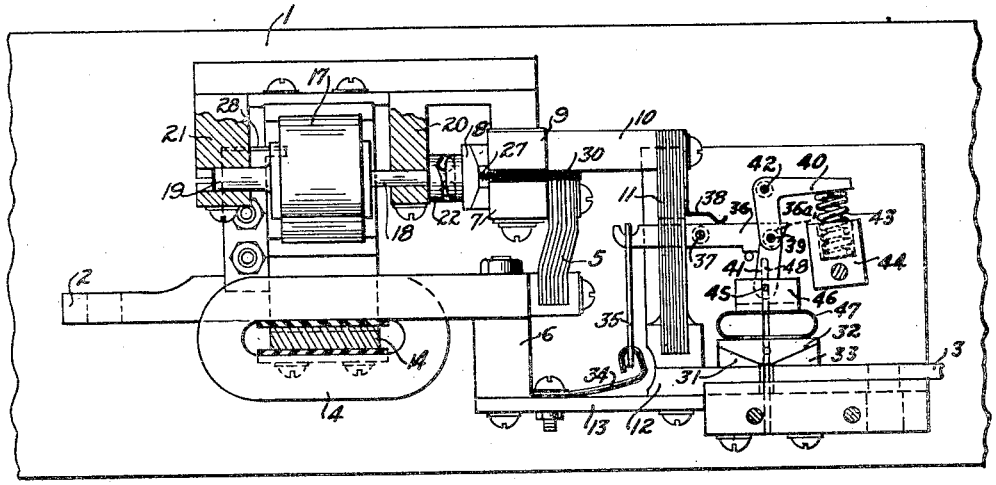

2,557,424

UNITED STATES PATENT OFFICE 2,557,424

DIRECTIONAL CIRCUIT PROTECTOR

Charles E. Gagnier, Manhattan Beach, and John Maxian, Jr., Los Angeles, Calif., assignors to North American Aviation, Inc.

Application March 7, 1947, Serial No. 733,000

5 Claims. (Cl. 175—294)

This invention relates to a circuit protective device and particularly to a device which will allow transmission of a large flow of electrical current in one direction but which will permit the transmission of only a smaller flow, predetermined in amount, in the opposite direction.

This device is primarily usable in direct current electrical circuits where it is desired to protect the major portion of a generating and distribution system from disturbances caused by a heavy fault, such as a grounded condition, occurring in a branch circuit.

It is therefore an object of this invention to provide a device which allows a large flow of electricity in one direction but which permits only a smaller predetermined flow in the opposite direction.

Other objects of the invention will become apparent from the following description and drawings, in which Fig. 1 is a front assembly view, partly in section, showing the various working parts in their operative positions;

Fig. 2 is a top plan view of the device shown in Fig. 1;

Fig. 3 is an end view looking to the right in Fig. 2;

Fig. 4 is a detailed view of a coupling member used in the device; and

Fig. 5 is a detail of a hook member in a circuit breaker.

Referring to the drawings, 1 is a casing for containing the device. This casing, a part only of which is shown, may be suitably constructed and sealed so as to be capable of being pressurized for use at high altitudes. A pair of connector elements 2 and 3 are adapted to be connected in an electrical circuit between, for instance, a battery and a generator. Between the connector elements 2 and 3 there is provided a divided circuit composed of two parts, one of which includes contact elements and the other a conductor element constructed and arranged so that the flow of current in the normal direction may be of a high value, whereas flow in the reverse direction may be limited to a relatively low value within predetermined limits. This result is brought about by the arrangement of parts presently to be described.

Referring to Fig. 1, connector element 2 is integral with a bus bar or conductor element 4 formed in the shape of a coil and to which is attached conductor elements 5 and 6. Element 5 forms, through contacts 7, 8, 9, and conductors 10, 11, and 12, a portion of one of the divided circuits between connector elements 2 and 3. Contacts 7 and 9 are separated by suitable insulating material 30. The other circuit is formed by element 13 attached to elements 6 and 12 and having predetermined resistance characteristics for a purpose to be hereinafter more fully described. Operatively associated with the coiled bus bar 4 and adapted to be magnetized by the effects of a flow of electricity therethrough is a soft iron magnetic structure consisting of parts 14, 15, and 16. Operatively mounted within the open ends of this magnetic structure is a permanent magnet rotor, element 17, having bearing elements 18 and 19 rotatably mounted in blocks 20 and 21 of insulating material suitably attached to the casing. The rotor element 17 is adapted to rotate in response to the field created about the arms 15 and 16 as a result of current flowing in a given direction through the coiled bus bar 4 but may not rotate in response to current flowing in the opposite direction. Journal 18 has operatively associated therewith a coupling member, part 22 of which is rigidly attached to journal 18 and part 23 of which is integral with contact 8 and restrained against rotation. Interposed between the elements 22 and 23 are antifriction elements 24 adapted to co-act with the inclined surfaces 25 and 26 of elements 22 and 23 respectively so that rotation of the rotor results in linear movement of the contact element 8 into engagement with its corresponding contacts 7 and 9. Spring 27 urges contact 8 out of engagement with contacts 7 and 9 upon a cessation or reversal of current flow through the bus bar 4. A stop member 28 is adapted to engage oppositely positioned lugs 29 on the rotor to restrict movement thereof. Thus it will be apparent that when current flows in one direction such as to the right in Fig. 1 the rotor 17 is energized to maintain contact 8 in engagement with contacts 7 and 9 to establish a circuit composed of conductors 4, 5, contacts 7, 8, 9 and conductors 10, 11, and 12. The circuit remains closed as long as current is flowing in the given direction. When current flows in the opposite direction, obviously, the rotor moves to a position which will allow the spring 27 to move the contact 8 away from the contacts 7 and 9.

Coming now to the arrangement for controlling the amount of electricity flowing in the opposite direction—to the left in Fig. 1—conductor elements 4, 6, 13, and 12 are connected with connector element 3 through the medium of contacts 31, 32, and 33. These contacts are adapted to be maintained in engagement to provide a closed circuit except for a flow condition in excess of the capacity of the "heater" element 13. To separate the contacts and open the circuit in such an event, there is attached to "heater" element 13 a bimetallic element 34 which in turn is suitably connected by a link 35 to one end of a lever or hook 36 pivotally mounted on the casing at 37 and urged in a clockwise direction by spring 38. The "heater" element is composed of conductor material having resistance characteristics predetermined according to the amount of current that is to be permitted to flow therethrough. Hook 36 is provided with a recessed portion 36a adapted to engage pin 39 which pivotally connects links 40 and 41. Link 40 is pivotally attached to the casing at 42 and is urged in a counter-clockwise direction by spring 43. The end of spring 43 engages an end of link 40 and the other end is pivotally fulcrumed to the casing by means of member 44. Attached to link 41 by means of a pin 45 is an element 46 to which is attached leaf spring 47 carrying contact 32. Pin 45 engages a guideway 48 in the casing for suitably guiding the contact 32 into proper engagement with contacts 31 and 33. In the operation of this portion of the device, with current flowing towards the left in Fig. 1 and contact element 8 out of engagement with contacts 7 and 9, current will flow through connector element 3, contacts 33, 32, and 31, and conductors 12, "heater" 13, 6, and 4. In the event the flow of current through the "heater" 13 causes its temperature to rise to a point which brings the bi-metal 34 to a predetermined temperature the element 34 will respond and exert a downward pull on link 35 to rotate hook 36 in a counter-clockwise direction and disengage portion 36a of the hook from pin 39 and permit spring 43 to raise contact 32 out of engagement with contacts 31 and 33. In such an event it is necessary, if it is again desired to close the circuit, to manually or otherwise engage hook 36 with pin 39 in the position as shown in Fig. 1 of the drawing.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A protector for a circuit comprising a bus bar coiled to produce a magnetic field, said circuit having a divided portion composed of two parts, one of which includes contact elements and the other of which includes a conductor having predetermined resistance characteristics, a soft iron magnetic structure operatively associated with said bus bar to be energized thereby, a rotor operatively associated with said structure and having coupling means engaging one of said contact elements so as to maintain the contact elements in closed position upon flow of current in a direction which causes said rotor to rotate, a circuit breaker in said circuit, and means responsive to the resistance characteristics of said conductor for operating said circuit breaker upon flow through said conductor with said contact elements in open position in a direction which does not rotate said rotor and which flow is in excess of a predetermined amount.

2. A protector for a circuit comprising a bus bar coiled to produce a magnetic field, arms forming a magnet and associated with said bus bar to be energized thereby, said circuit being provided with a divided portion composed of two parts, one of which includes contact elements and the other of which includes a conductor having predetermined resistance characteristics, a rotor adapted to be actuated by said magnet, coupling means operatively connecting said rotor and contact elements whereby flow of current in a given direction causes said rotor to maintain said contact elements in closed position, a circuit breaker in said circuit, a heat responsive element associated with said conductor, and means operatively associated with said heat responsive element and said circuit breaker for operating said circuit breaker to open said circuit upon heating of said conductor beyond a predetermined amount by flow therethrough opposite to said given direction with said contact elements open.

3. A protector for a circuit comprising a divided portion composed of two parts, one of which includes a switch having two contact elements and the other of which includes a "heater" having predetermined resistance characteristics; a magnetic core; a loop on said core in series with said circuit; a rotor rotatably mounted in magnetic relation to said core so as to turn in one direction when current flows in one direction in said circuit, and to turn in the opposite direction when current flows in the opposite direction in said circuit, said switch being operable by rotation of said rotor to make said contact elements close when said rotor turns in one direction, and open when said rotor turns in the opposite direction; a circuit breaker in said circuit; and means responsive to the resistance characteristics of said "heater" for operating said circuit breaker upon a flow of circuit through said "heater" in said opposite direction with said contacts in open position, to thereby cause a temperature in excess of a predetermined value.

4. A protector for a circuit comprising a divided portion composed of two parts, one of which includes contact elements and the other of which includes a conductor having predetermined resistance characteristics; a magnetic core; a winding on said core in series with said circuit; a rotor magnetically associated with said core so as to turn in one direction in response to unidirectional flow of current through said circuit, said contact elements adapted to be closed by rotation of said rotor in one direction and opened by rotation of said rotor in the other direction, to maintain said contact elements in closed position upon flow of current in a given direction whereby current will flow in such direction through both said parts; a circuit breaker in said circuit; and means responsive to resistance characteristics of said conductor for operating said circuit breaker upon flow through said conductor of current in excess of a predetermined amount in a direction opposite to said given direction with said contact elements open.

5. A protector for a circuit comprising a divided portion composed of two parts, one of which includes a switch having two contact elements and the other of which includes a conductor having predetermined resistance characteristics; a magnetic core; said circuit comprising a heavy current conducting loop wound around said core, a rotor mounted in magnetic relation to said core so as to turn in one direction when current flows in one direction in said loop and to turn in the opposite direction when said current flows in the opposite direction in said loop, said switch being operable by rotation of said rotor to make said contact elements close when said rotor turns in one direction and open when said rotor turns in the opposite direction; a circuit breaker in said circuit; and a bi-metallic element operatively associated with said conductor; means connecting said bi-metallic element to said circuit breaker whereby flow of current in a direction opposite to said given direction and with said contact elements in open position will cause said bi-metallic element, in response to a flow of current in excess of a predetermined amount, to operate said circuit breaker.

CHARLES E. GAGNIER.
JOHN MAXIAN, Jr.

REFERENCES CITED

The following references are of record in the file of this patent:

UNITED STATES PATENTS

| Number | Name | Date |
|---|---|---|
| 567,608 | Parshall | Sept. 15, 1896 |
| 708,008 | Ball | Sept. 2, 1902 |
| 821,586 | Gough | May 22, 1906 |
| 1,030,555 | Wilkinson | June 25, 1912 |
| 1,110,151 | Stein | Sept. 8, 1914 |
| 1,700,661 | Appelberg | Jan. 29, 1929 |
| 1,708,789 | Hall | Apr. 9, 1929 |
| 1,832,583 | Roberts et al. | Nov. 17, 1931 |
| 1,994,921 | Rose | Mar. 19, 1935 |
| 2,301,992 | Agnew | Nov. 17, 1942 |
| 2,303,581 | Rudd | Dec. 1, 1942 |
| 2,323,776 | Johnson | July 6, 1943 |
| 2,350,825 | Romer | June 6, 1944 |

FOREIGN PATENTS

| Number | Country | Date |
|---|---|---|
| 108,368 | Switzerland | Feb. 25, 1924 |
| 494,395 | Great Britain | Oct. 25, 1938 |